(12) United States Patent
Tritz

(10) Patent No.: US 8,397,905 B1
(45) Date of Patent: Mar. 19, 2013

(54) MULTI-CHANNEL AUTOMATED CONVEYOR SYSTEM AND METHOD FOR ALIGINING AND TRANSFERING OF SMALL OBJECTS

(76) Inventor: Jared M Tritz, Ann Arbor, MI (US)

( * ) Notice: Subject to any disclaimer, the term of this patent is extended or adjusted under 35 U.S.C. 154(b) by 139 days.

(21) Appl. No.: 13/150,424

(22) Filed: Jun. 1, 2011

(51) Int. Cl.
*B65G 21/22* (2006.01)
*B65G 15/10* (2006.01)

(52) U.S. Cl. .................................. 198/817; 198/836.1
(58) Field of Classification Search .............. 198/817, 198/836.1
See application file for complete search history.

(56) References Cited

U.S. PATENT DOCUMENTS

| | | | | |
|---|---|---|---|---|
| 2,564,680 A | * | 8/1951 | Faller | 118/106 |
| 3,159,430 A | * | 12/1964 | Kinney | 198/817 |
| 3,627,126 A | * | 12/1971 | Fitzgerald et al. | 209/41 |
| 4,230,223 A | * | 10/1980 | Flajnik | 198/817 |
| 4,279,346 A | * | 7/1981 | McClure et al. | 209/582 |
| 5,168,978 A | * | 12/1992 | Cox et al. | 198/369.5 |
| 7,530,453 B2 | * | 5/2009 | Ingraham | 198/836.3 |

* cited by examiner

*Primary Examiner* — Mark A Deuble

(57) ABSTRACT

An automated multi-channel conveyor system comprises a plurality of channels for alignment, non-destructive transfer, and an accurate delivery of each of the plurality of small objects to a precise target destination. Each channel comprises alternate-profiled fins, pulleys, and belts. The pulleys within the set are connected to one another by two belts nestled in between and running parallel to the two fins. The belts are automated, travel continuously at predetermined speeds, accept a plurality of small objects, and facilitate uniform distribution by way of indentations. The fins and belts keep the objects aligned and uniformly distributed as the belts carry the accepted objects to a destination. A single-filed, uniform distribution of small objects within each channel and within a plurality of channels is a key to an efficient, automated, accurate, and precise delivery of the objects to a target destination.

1 Claim, 3 Drawing Sheets

MULTI-CHANNEL AUTOMATED CONVEYOR SYSTEM AND METHOD FOR ALIGINING AND TRANSFERING OF SMALL OBJECTS

FIELD

The present subject matter relates in general to a conveyor system and method, and specifically, to a multi-channel, automated conveyor system and method for non-destructive transfer of similar in shape and size, and requiring alignment, small objects to a precise target destination.

BACKGROUND

Conveyors come in a variety of designs and sizes, and find versatile applications across a wide spectrum of fields, including manufacturing, selling, shipping, and agricultural industries. The underlining purpose of all conveyor systems is to transfer articles, or objects, such as fruits, vegetables, grain, processed or packaged products, etc., from one location to another location. Objects are advanced with a constant or variable velocity over a predetermined conveyor distance.

Existing conveyor systems attempt to customize and optimize the transferring operation by way of preparing articles carried by a conveyor for the next step or destination. Current conveyor systems for sorting of small articles, such as fruit, only provide random spacing between articles. Some systems use a variety of measuring devices for sorting by way of appearance or size at some point along the transfer route. Such systems lack an ability to align small objects uniformly and evenly. Slat and tray types of conveyors aim to uniformly align articles. However, slat and tray structural limitations leave the delivery to target destination often imprecise and inaccurate. Thus, existing conveyor systems and methods are not capable of transferring of large batches of small objects arrayed one-by-one, uniformly-spaced within single file channels, and within a plurality of such channels, in a continuous manner and delivering of the batch object-by-object to an exact target destination.

With large quantities of small objects, such as cranberries or blueberries, existing conveyor systems and methods do not, however, provide for an individual fruit's precise and accurate delivery to a precise sensing and sorting target destination. When embedded within another system, for example, a sorting system for fruits or vegetables, as further described in a related, commonly-owned U.S. patent application Ser. No. 12/361,753 ('753), filed Dec. 15, 2008, pending, the disclosure of which is incorporated herein by reference, a customized conveyor capable of aligning and delivering large quantities of small objects, one-by-one, precisely and accurately to a sensor target location is highly desirable.

Therefore, a need exists for a conveyor system and method to provide an efficient, expedited, uniform, and controlled distribution of small objects into a plurality of uniformly spaced-apart, single-file channels, rows, or lanes. A need exists to distribute, arrange, and align objects as soon as the objects are introduced to the conveyor system. When the quantity of small objects increases, the need for such a system and method is particularly acute. Needed are a system and method, which can provide an efficient and reliable response handling and evenly distributing of a plurality of small objects into a plurality of channels.

Further problems with existing conveyors include stickiness of residue and small object jamming as well as, machine oil contamination of fruit. Adhesion of residue to the conveyor system from deformed, stuck, and crushed small objects reduces efficiency of the conveyor's operation. Jamming obstructs the pathway for subsequent objects, slows down the functioning of the system, increases the cost of the operation, and contributes to a significant reduction to the quality and quantity of the end product.

In extreme situations, when perishable goods, such as cranberries, by way of example, jam the system, the remaining batch degrades in quality, waiting for the conveyor system to be cleaned and operational again. When augmented to, or embedded within another system, an inefficient conveyor system may slow down the overall system's processing, manufacturing, and product finalizing performance. A need exists for an automated, non-destructive, easy to maintain, conveyor system and method that would significantly reduce inefficiencies due to jamming of small objects.

Thus, a need exists to provide an efficient conveyor system and method able to non-destructively transport large quantities of objects, such as cranberries, and aligning the objects for targeted delivery to a well-defined sensing destination. Further, a need exists for a conveyor of small, fragile objects to significantly reduce channel-jamming. Such conveyor system and method would preserve the quality of end product by maintaining optimal operation of the conveyor system and subsequently optimal operation of a system of which the conveyor system may be a part.

Although primarily described in agricultural context, and in particular embodiment of cranberry arraying and conveying for sorting purposes system, such conveyor system could apply to any other field, where a plurality of small objects needs to reach a target destination in an individualized, rapid, successive, reliable, precise and accurate, object-by-object manner.

SUMMARY

An automated conveyor system ("conveyor") comprises a plurality of channels. In one embodiment, the channels are uniformly distributed on a delivery board, also known as a bed, runway, or a delivery surface. Each channel includes a set of two, spaced-apart, alternately-shaped or profiled, parallel fins extending longitudinally along the delivery board; a set of at least two pulleys or rollers, each rotably affixed to one of the two opposing ends of the delivery board, wherein the rollers are connected to one another by way of belts; a set of at least two belts automated to run at a predetermined speed, is nestled in between, and parallel to, the spaced-apart set of fins, and rotably affixed to the rollers.

The belts, nestled within a channel, continuously accept and uniformly distribute a plurality of objects starting at an object's point of entry, which is a feed point. The belts then carry the objects, while continuing to uniformly align the objects within single-file channels, toward a precise point of exit from the conveyor. In aligned channel arrays, small, fragile objects, such as cranberries, travel at a set, and adjustable velocity, towards the end of the runway. At the point of exit, the belts diverge apart, releasing and delivering each object to a target destination.

In a further embodiment, affixed either removably or permanently to the delivery board, the fins aid with object distribution. Initially, the fins guide the objects into the channels, and subsequently, maintain the objects aligned and evenly-spaced within the channels. The objects ride on belts, nestled between two alternately profiled, that is, differently-shaped fins. The fins may alternate in height and thickness. The difference in shape, height, and thickness is a function of the shapes and sizes of the objects.

In a further embodiment, at a predetermined feed point, objects, guided by the alternately-profiled fins, are loaded onto the belts. The objects become automatically aligned, and uniformly spaced, within single-file channels and carried by the belts to a drop-off, exit, or delivery point, at which point the objects are released to arrive at a precise destination. As objects approach the exit point, the belts within each channel spread apart and release each object individually. The drop-off pulley provides grooves within a pulley, which at the drop-off point guide the two belts to diverge and release the small object.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Although described in this application in relation to agricultural conveyor system for aligning and transfer of cranberries, blueberries, or other similar in size objects, the embodiments described apply generally to applications for non-destructive transfer of small objects via a conveyor system, and may apply to other types of systems, as would be apparent to one skilled in the art.

System

Figure 1:
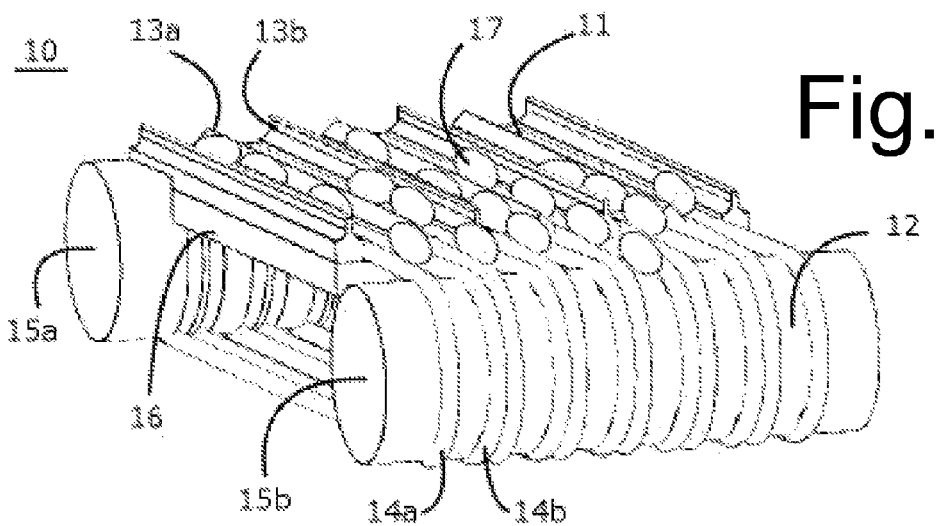
FIG. 1 is a functional diagram showing a multi-channel conveyor system for non-destructive transfer of small objects, in accordance with one embodiment of the present invention.

FIG. 1 is a diagram showing a system 10 for a non-destructive transfer of a bulk of small objects 17 from one location to a highly precise, object-individualized, target destination, using a multi-channel conveyor system, in accordance with one embodiment. The system 10 comprises a delivery board 16, also known as a runway, or a delivery surface comprising a transfer length and a transfer width; one or more sets of rollers or pulleys 15a-b rotably attached to the delivery board 16; and a plurality of channels extending along the transfer length and uniformly distributed across the transfer width of the delivery board, each channel 11 comprising a set of two belts 14a-b connecting the rollers and extending longitudinally along the delivery board 16, accepting, uniformly aligning, and carrying the objects; and a set of two alternating in profile fins, also known as walls, partitions, corrugations 13a-b, affixed to, and extending longitudinally along the delivery board 16, providing guidance for objects to align and remain aligned within each channel until the point of exit. The fins are spaced apart and extend longitudinally along the delivery board 16 to nestle each set of belts and to separate one set of belts 14a-b from the next set of belts. At feeding point, the fins 13a-b guide objects into channels and subsequently maintain and carry the objects 17 in aligned, uniformly-spaced, single-file positions within each channel. Such arrangement of alternate-profile-shaped fins 13a-b, and two belts 14a-b rotating about and extending between pulleys, and running parallel to the fins 13a-b, facilitates a consistent, fast, abrasion-reducing, wedging-reducing, and jam-reducing arrangement of small objects into rows or lanes.

The conveyor may be positioned horizontally or at an angle carrying objects in either upward or downward to a target destination. The conveyor system, in a further embodiment, may be embedded within a bigger system or may be augmented to another system such as, by way of example, the piezoelectric tactile sorter primarily intended for sorting of cranberries, as further described in a related, commonly-owned U.S. patent application Ser. No. 12/361,753, filed Dec. 15, 2008, pending, the disclosure of which is incorporated herein by reference.

Figure 2:
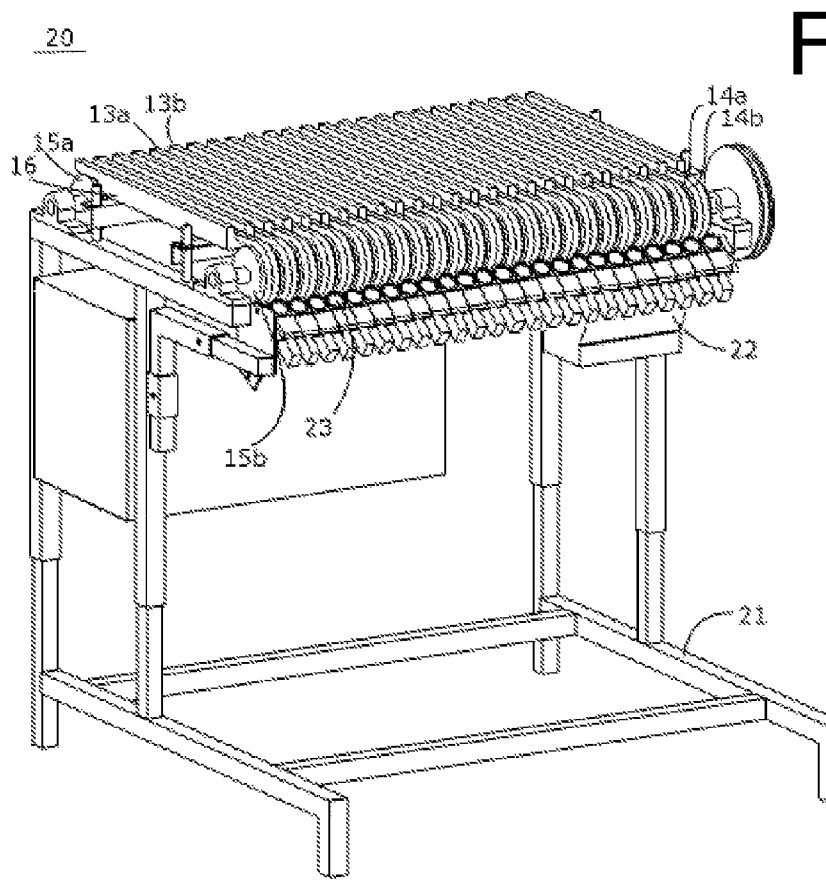
FIG. 2 is a functional diagram showing, by way of example, a sorting system incorporating the multi-channel conveyor system of FIG. 1, in accordance with one embodiment.

In one embodiment, the multi-channel conveyor system 10 is affixed either removably or permanently to a supporting frame 21, as shown in FIG. 2. The frame 21 serves a structural and supportive purpose as various components are added, movably affixed to, or permanently affixed to the frame. In one embodiment, as shown in FIG. 2, the delivery surface 16, is distributed into linear grooves, also known as rows, channels, or lanes, 11, outlined by walls, also known as partitions or fins 13a-b, accepting and automatically guiding a multitude of objects 17 into a plurality of single-file lanes 11. In one embodiment, a roller 15a is powered by a motor 22 via a drive belt (not shown) and propels the object carrying belts forward at predetermined velocity. Small objects 17, such as cranberries or blueberries, are arranged and settle into each of the lanes and ride on the delivery belts or belts 14a-b until the drop off. The drop off point is the point of exit for each object from the conveyor system. In one embodiment, the drop off point 12 is the point the end of the delivery surface 16, when each individual berry is dropped from the delivery surface 16 onto sensing surfaces 23, by way of example. In a further embodiment, the sensing surfaces are located each at the end of each lane and aligned to accept objects 17 cascading off of the delivery surface 16 in a rapid succession, one-by-one. Such channeled alignment promotes a high accuracy and precision of delivering a multitude of small objects 17 at individualized, one-by-one, rate to a target destination.

Fins

Figure 3:
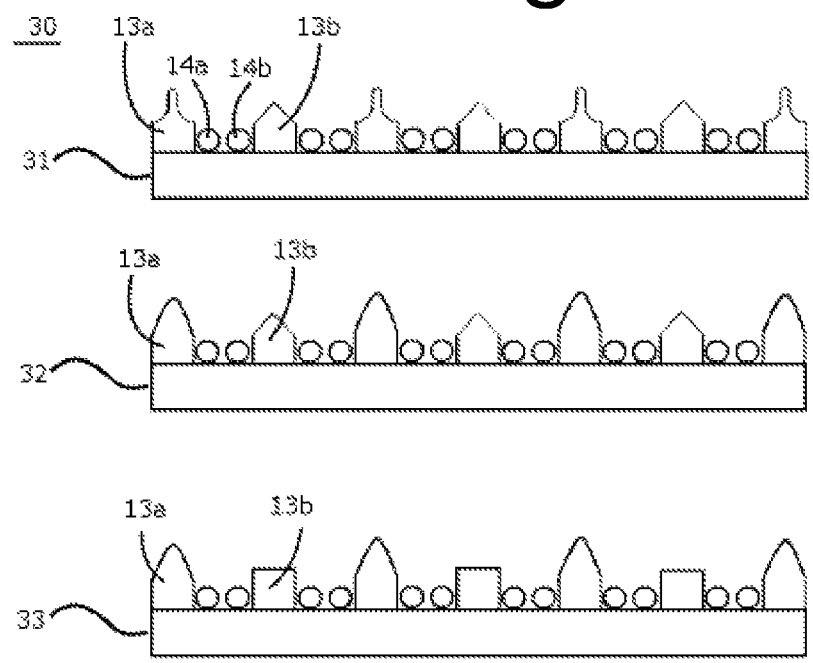
FIG. 3 is a functional diagram showing examples of alternate profiled fin array, of the system of FIG. 1, in accordance with one embodiment.

FIG. 3 illustrates a cross-sectional view of arrangement and alternate-shape profiling of the fins 13a-b. The fins, also known as walls, partitions, corrugations, are attached to, and extend longitudinally, along the delivery board 16, as shown in FIGS. 1 and 2. The fins 13a-b provide wall infrastructure for the channels 11, as shown in FIG. 1. The fins 13a-b guide the objects 17 into the channels 11 and maintain the objects in aligned positions as the objects are carried by the belts 14a-b. The fins 13a-b aid in ensuring object alignment, distribution, settling, and delivery of the object to a target destination.

As shown in FIG. 3, each set of fins 13a-b creates walls or barriers of each channel 11 to nestle each set of belts 14a-b and to prevent objects from derailing off of the belt track. The fin/belt array extends uniformly across the delivery board, creating an array of fin 13a, belt 14a, belt 14b, fin 13b, belt 14a, belt 14b, fin 13a . . . and so forth across the surface board 16, creating a multi-channel conveyor.

In a further embodiment, the fins 13a-b alternate in profile shape, height, width, hardness, friction properties, wearability, and elasticity. The fin 13a is convexly profiled and the next fin 13b is profiled concavely, so that a pattern of convex-concave-convex-concave, and so forth, appears. The profile may also be triangular-concave-triangular-concave-, etc. Other types of alternating and non-alternating profiles are possible. Such alternating profiling mitigates object jamming starting at the feed point and subsequently, along the delivery surface through to the exit point. The alternating profiling further promotes efficient alignment, row formation, and non-destructive transfer of small objects in a predetermined direction. The shape of alternating profiles, height, width, elasticity, and distance between fins, are predetermined based upon, and customized to, the average and standard deviations of object properties, such as size, height, width, length, shape, diameter, viscosity, fragility of objects, softness. Other types of properties and parameters apparent to one skilled in the art are may be considered and utilized.

Rollers:

In one embodiment, the drive roller, or the drive pulley 15b is powered using an electric motor 22, as shown in FIG. 2, and a frequency drive to control the speed. The drive roller 15b is coupled to the electric drive motor with a drive belt (not shown). The rollers or pulleys 15a-b, within each set are connected to one another by way of continuous loop belts 14a and 14b, as shown in FIG. 2. The belts 14a-b are capable of continuous operation; accepting, carrying, propelling, and delivering small objects 17 from the point of entrance, feed or load point 11 to the drop off or exit point 12.

Figure 4:
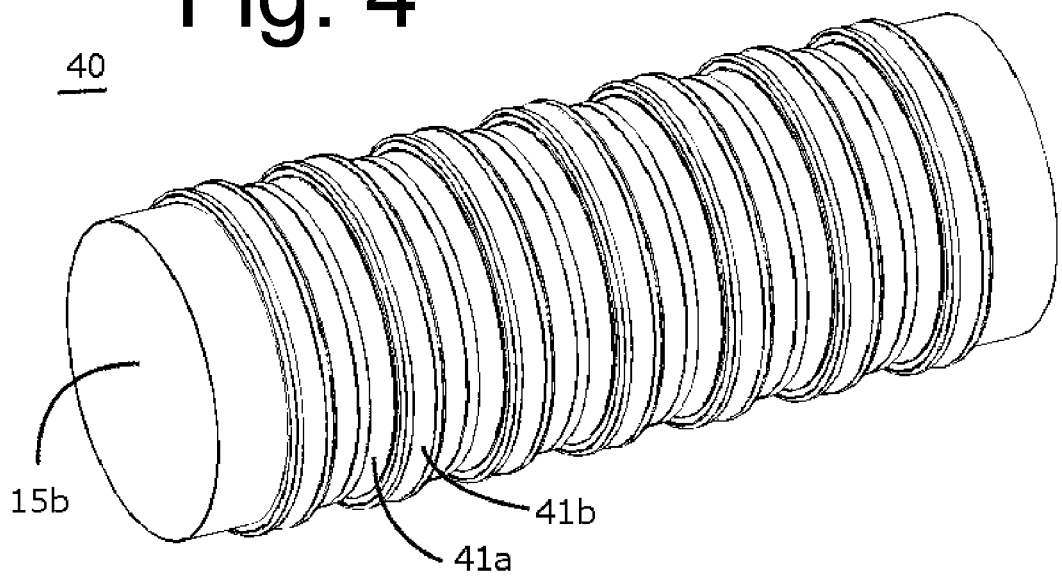
FIG. 4 is a block diagram showing a roller with differing grooves for belt positioning, of the system of FIG. 1, in accordance with one embodiment.

FIG. 4 is a block diagram showing a roller 15b with differing grooves for belt positioning. The grooves 41a and 41b vary in depth and provide a small and a large diameter for each belt within the set. Each pulley comprises at least two grooves of varying depths within the pulley, and thus, forming circles of varying diameters around the pulley. Belts are rotably positioned within the groves of each pulley and connect a set of pulleys separated by the transfer distance.

Each pulley has at least one set of two belts revolving about the pulley. Within each channel 11, at least two parallel belts are driven by the powered roller 15a and revolve about the rollers, carrying objects to the exit point. The belts may revolve at different speeds. The groove may also be cut and positioned to angle the belts. At the exit point, the groves in the roller 15b proximal to the exit point are profiled to facilitate spreading apart of the belts 14a and 14b.

The groove spacing in the roller 15b allows the belts 14a-b to spread slightly apart, and release the object from the conveyor system at a more consistent, predetermined aim and velocity for the target destination. Other rollers, pulley for various belt configurations and positioning are possible.

Belts

Figure 5:
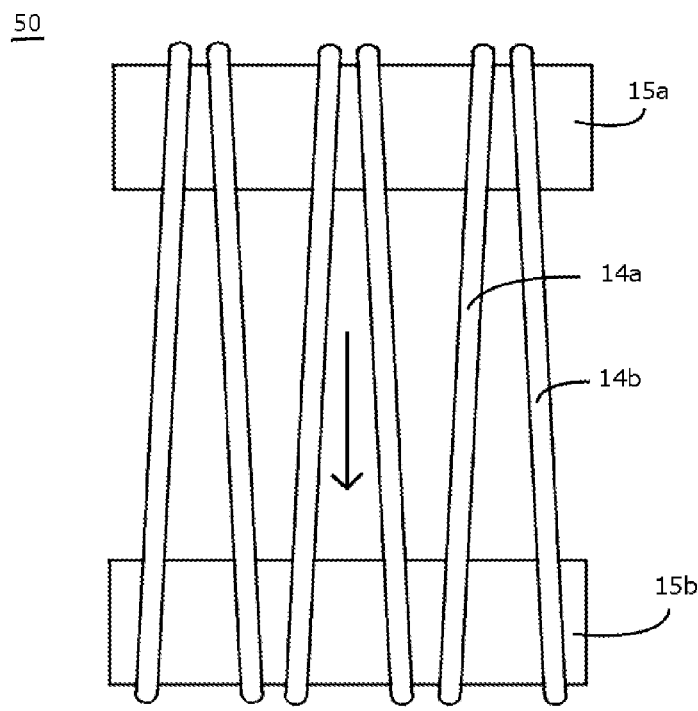
FIG. 5 is a functional block diagram showing top view of belt configuration and spreading at an exit point of the system of FIG. 1, in accordance with one embodiment.

In one embodiment, the conveyor system includes automated belts 14a-b, as shown in FIGS. 1 through 5. Two belts run nestled within channels created by the fins 13a-b. FIG. 5 is a block diagram emphasizing belt spreading at the exit point and illustrating a top view of the belts extending between and rotating about the rollers 15a and 15b and spanning over the length of the runway 16 (Fins and objects are not shown in FIG. 5). At the loading point, proximal to the roller 15a, the powered belts 14a-b accept, sweep, and automatically begin to align, and carry the objects, in the direction of the arrow, to the exit or drop off point, which is proximal to roller 15b. At the exit point, the belts 14a and 14b diverge apart and release an object.

In one embodiment, the belts 14a-b are textured or indented to facilitate a plurality of singular lane arrangement and uniform object distribution within each channel 11. The belts 14a-b, in a further embodiment, are cylindrical, approximately three eighth of an inch in diameter, and made of polyurethane. In still other embodiment, a belt comprises one or more structural layer, fabric, rubber, silicon, mesh, plastic, graphite, or any other type of material, or combination of materials. In one embodiment, belts travel at a predetermined and adjustable velocity. Belts, in one scenario, are positioned at an angle to one another.

In a further embodiment, the belts rotate around a drive roller or a pulley 15b and a second roller or a pulley 15a and span the distance of the conveyor's length that is the length of the delivery board 16, as shown in FIGS. 1 and 2. The belts 14a-b are guided within channels 11 and run parallel to two alternating-profile finned walls 13a-b. The groove, or lane, spacing in the rollers or pulleys is widened so that the belts 14a-b are spread slightly apart, as shown in FIG. 5, preparing to exit an object from the conveyor. The corrugated delivery surface enables release of the fruit and improves accuracy of delivery of an object to subsequent destination. The belt diameter and shape are optimized to reduce stretching or breaking of the belts and increase functionality, durability, and reliability. Stretching causes the belt to accelerate at the drop off, or exit, point, which exacerbates variations in objects' velocity vector, at the point of exit. In a further embodiment, belt tension is adjustable. In a still further embodiment, the belts within each set can be positioned at various angles to one another to aid with non-destructive, softness-sensitive, carrying of the objects. A plurality of pairs of belts 14a-b can span the length of the delivery surface 16.

In one embodiment, the belts are guided by a plastic board with grooves in the board situated so that the belts 14a-b stay parallel to each other at a fixed distance apart. The delivery surface 16 is positioned between the rollers or pulleys and outfitted with raised partitions, or fins 13a-b, separating each set or pair of belts 14a-b from the next set of belts. In a further embodiment, the belt speed adjustable within a range of, by way of example, between 0.3 and 0.8 meters per second. Other belts, components, and configurations are possible.

Method

FIGS. 1-5 illustrate non-destructive transfer objects using a conveyor system 10. The transfer is performed as a series of process steps by the conveyor system. Small objects enter the system at a feed point at a predetermined, controlled rate. Objects then travel on the delivery surface at a predetermined or adjustable velocity and frequency to reach the drop off point, and to reach next destination, one-by-one in a rapid succession. Plurality of small and fragile objects are received, transferred, and delivered to a destination efficiently, accurately, precisely, and in a non-destructive manner at predetermined, set time intervals.

In a further embodiment, a corrugated delivery surface 16 is secured by guide walls or fins 13a-b placed between each pair of belts. The fins of the corrugation guide the fruit into a single file line by holding back berries that have not settled into the center until space for them opens up in the single file line and the corrugation are approximately 1.5 inches on center and cranberries rest in rows of approximately 1.5 inches on the center.

Figure 6:
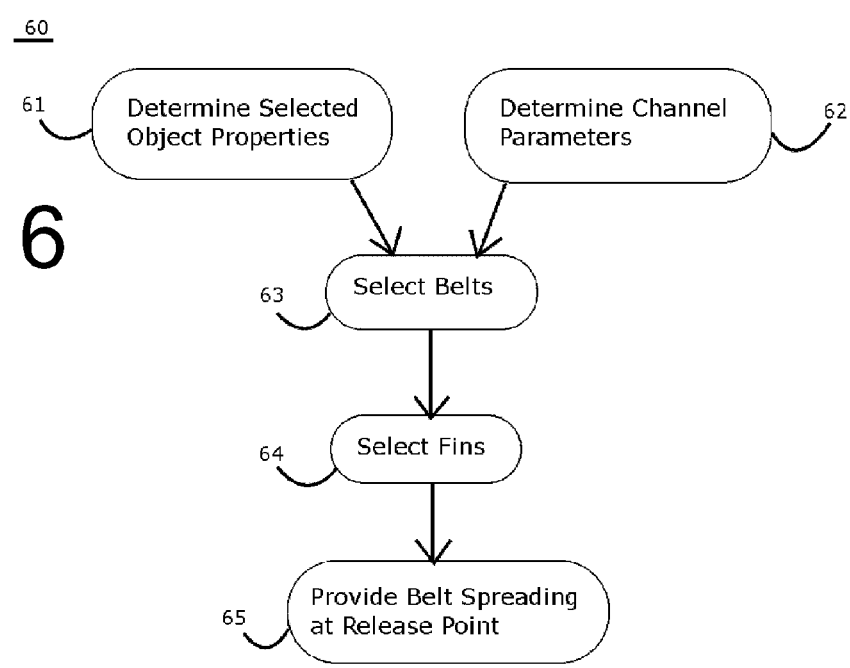
FIG. 6 is a flow chart diagram showing the method of aligning and transferring of plurality of objects, in accordance with one embodiment of the present invention.

FIG. 6 is a process flow chart showing a method 60 for aligning and conveying a bulk of small objects within channels. In one embodiment, a batch of small objects of one kind 17 is preselected, such as cranberries or blueberries. Initially, objects' properties, including an average and maximum diameters, standard deviations, and the overall range of dimensions, sizes, shapes, weight, softness, elasticity are determined (61). Objects' properties are input into customizing of the conveyor system and selecting, among other parameters, appropriate fins, belts, and channel dimensions, rate of feed, belt velocity, and type of automation. Once the system is built, object parameters serve as adjusting parameters to select, adjust, fine-tune, and troubleshoot the system. Various types of factors, part parameters, such as belt tension, structure, composition, width, angle, thickness, elasticity, fin height, shape, thickness, elasticity, object properties, such as softness, shape, size, fragility may be considered as apparent to one skilled in the art may be correlated for system and method optimization.

Fin profile, shape, thickness, height, texture, uniformity, elasticity, and fin separation are at first determined as a function of various and a combination of object dimensions and properties. Similarly, the belt's size, structure, shape, resilience, elasticity, texture, thickness, and other properties are a function of object properties.

In a further embodiment, computer modeling is applied to account for variations in parameters and to optimize and facilitate an efficient method of loading objects onto the conveyor's delivery surface, transferring the objects over a predetermined distance of the delivery surface via sets of belts, and exiting the objects in an optimally non-destructive and cost and time efficient way. A computer model is developed to optimize effects of variations in velocities of belts, transition speed at load and exit points, sizes of objects, softness of objects, alignment of objects within a lane, accuracy and precision of delivery past the exit point to the subsequent sorting or conveying system, or any other destination. Computer modeling optimizes the method of non-destructive aligning and conveying of small objects.

While the invention has been particularly shown and described as referenced to the embodiments thereof, those skilled in the art will understand that the foregoing and other changes in form and detail may be made therein without departing from the spirit and scope of the invention.

What is claimed is:

1. A multi-channel conveyor system for automated aligning and transferring of small objects, comprising:
   a delivery surface comprising a transfer length and a transfer width; and
   a plurality of channels extending along the transfer length and uniformly distributed across the transfer width of the delivery surface, with each channel configured to accept at a feed point, align, transfer, and deliver a plurality of objects, accurately one-by-one to a precise target destination, the channel further comprising:
      a set of two spaced-apart, alternately-profiled fins extending longitudinally along the transfer length of the delivery board and configured to guide and maintain the plurality of objects within the channel;
      a set of at least two rollers rotably affixed each to the opposing ends of the transfer length of the delivery surface, and perpendicularly to the channel, wherein at least one roller is powered; and
      a set of two belts rotably affixed to and connecting the rollers and extending over the transfer length of the delivery surface and in between the fins, driven by the powered roller, configured to accept, uniformly distribute, carry a plurality of objects within each of the channels in single-file lanes, and deliver each object accurately to a precise target destination.

* * * * *